(12) United States Patent
Vora

(10) Patent No.: US 12,293,404 B2
(45) Date of Patent: *May 6, 2025

(54) INTERACTIVE SHOPPING SYSTEM AND METHOD

(71) Applicant: SWIFTGO, INC., Houston, TX (US)

(72) Inventor: Jigesh V. Vora, Houston, TX (US)

(73) Assignee: Swiftgo, Inc., Houston, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/122,198

(22) Filed: Mar. 16, 2023

(65) Prior Publication Data

US 2023/0245221 A1    Aug. 3, 2023

Related U.S. Application Data

(63) Continuation of application No. 17/354,564, filed on Jun. 22, 2021, now Pat. No. 11,636,533, which is a continuation of application No. 17/124,075, filed on Dec. 16, 2020, now Pat. No. 11,645,703, which is a continuation-in-part of application No. 14/952,718, filed on Nov. 25, 2015, now Pat. No. 10,915,936, which is a continuation-in-part of application No. 14/714,076, filed on May 15, 2015, now Pat. No. 9,230,249.

(60) Provisional application No. 62/139,404, filed on Mar. 27, 2015.

(51) Int. Cl.
| | |
|---|---|
| *G06Q 30/0601* | (2023.01) |
| *B62B 3/14* | (2006.01) |
| *G06Q 20/20* | (2012.01) |
| *G06Q 30/0241* | (2023.01) |
| *G07G 1/00* | (2006.01) |
| *G07G 1/01* | (2006.01) |

(52) U.S. Cl.
CPC ....... *G06Q 30/0641* (2013.01); *B62B 3/1408* (2013.01); *G06Q 20/208* (2013.01); *G06Q 30/0241* (2013.01); *G07G 1/0081* (2013.01); *G07G 1/01* (2013.01)

(58) Field of Classification Search
None
See application file for complete search history.

(56) References Cited

U.S. PATENT DOCUMENTS

| | | | |
|---|---|---|---|
| 2008/0191435 A1* | 8/2008 | Guercia | B62B 5/06 280/33.992 |
| 2011/0036907 A1* | 2/2011 | Connelly | G07G 1/0036 235/383 |

(Continued)

FOREIGN PATENT DOCUMENTS

WO    WO-2015051303 A1 *    4/2015    ....... G06K 19/06037

*Primary Examiner* — Ariel J Yu

(74) *Attorney, Agent, or Firm* — Conley Rose, P.C.

(57) ABSTRACT

An interactive shopping system, or smart cart. The system allows a user to select items in a store and complete a purchase without having to wait in lines or interact with store personnel. The system can have a container for holding products selected by at least one user, a user interface, a scanner in communication with the user interface, a processor in communication with the user interface, and a data storage comprising computer instructions executable by the processor. A user can select products, place them within the container, scan the products, and initiate a payment transaction to complete a purchase.

6 Claims, 1 Drawing Sheet

(56) References Cited

U.S. PATENT DOCUMENTS

| | | | | |
|---|---|---|---|---|
| 2012/0284132 A1* | 11/2012 | Kim | ............ | G06Q 20/18 |
| | | | | 235/375 |
| 2014/0339278 A1* | 11/2014 | Ditore | ............ | H04M 1/04 |
| | | | | 224/411 |
| 2015/0206121 A1* | 7/2015 | Joseph | ............ | G07G 1/0072 |
| | | | | 705/26.8 |

* cited by examiner

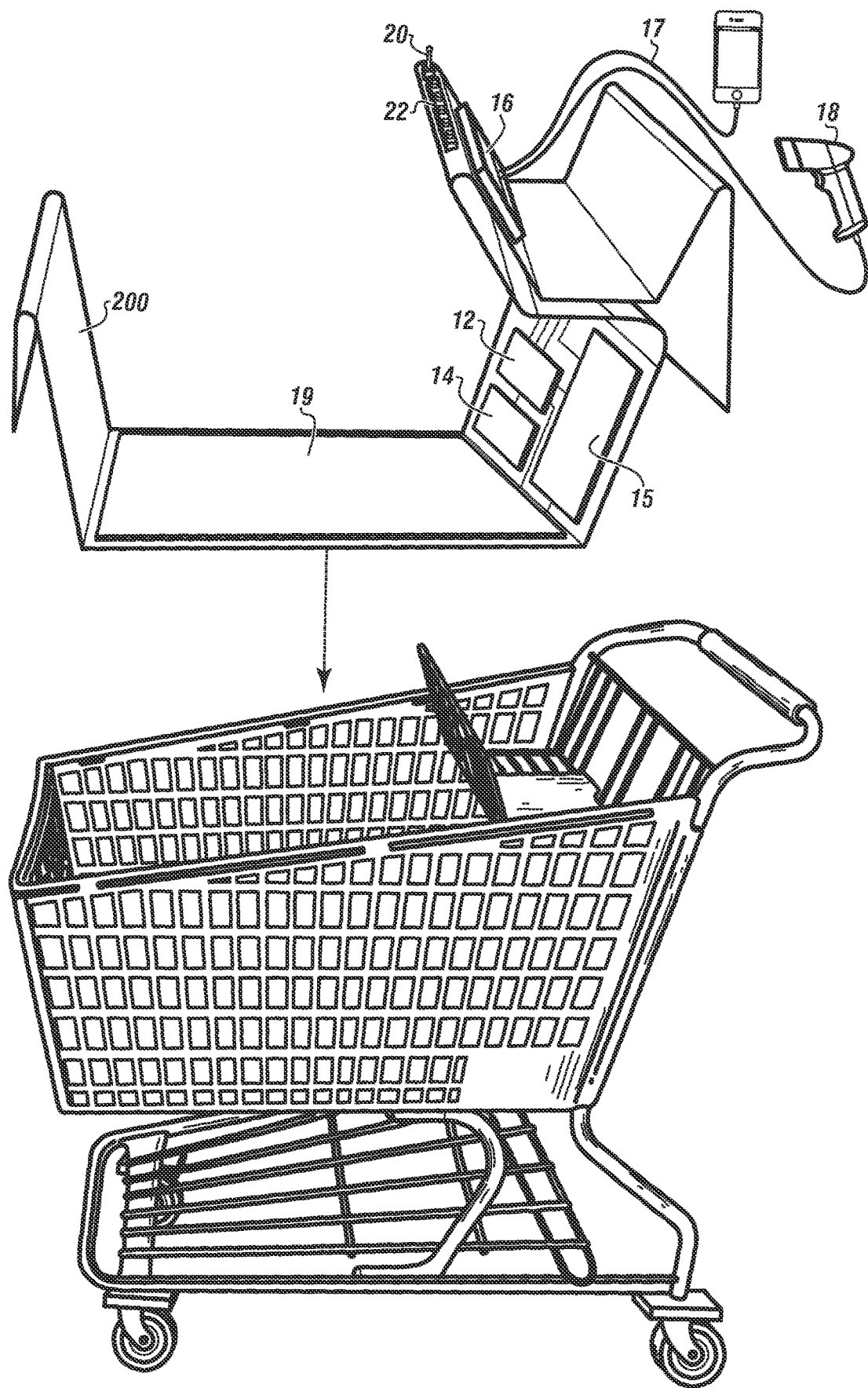

INTERACTIVE SHOPPING SYSTEM AND METHOD

CROSS REFERENCE TO RELATED APPLICATIONS

The present application is a continuation of U.S. nonprovisional patent application Ser. No. 17/354,564 filed Jun. 22, 2021, which is a continuation of U.S. nonprovisional patent application Ser. No. 17/124,075 filed Dec. 16, 2020, which is a continuation in part of U.S. nonprovisional patent application Ser. No. 14/952,718 filed Nov. 25, 2015, now U.S. Pat. No. 10,915,936, issued on Feb. 9, 2021, which is a continuation in part of U.S. nonprovisional patent application Ser. No. 14/714,076 filed May 15, 2015, now U.S. Pat. No. 9,230,249, issued on Jan. 5, 2016, which claims benefit of U.S. provisional patent application No. 62/139,404 filed on Mar. 27, 2015, all titled "Interactive Shopping System and Method", and all of which are incorporated herein by reference in their entirety.

FIELD

The current embodiments generally relate to an interactive shopping system.

BACKGROUND

A need exists for an overall improved customer experience at retail stores.

Customers desire a faster, frictionless, and more seamless process for making purchases in store.

A further need exists for more efficient security in retail stores. Stores experience significant losses due to theft and a system for monitoring this is desirable.

A further need exists to provide critical user data/information that will allow brick and mortar retail stores to compete with the online stores by providing analytics and user data that currently cannot be tracked and is unavailable for users that walk into retail stores.

The present embodiments meet these needs.

BRIEF DESCRIPTION OF THE DRAWINGS

The detailed description will be better understood in conjunction with the accompanying drawings as follows:

The Figure depicts an embodiment of the present disclosure.

The present embodiments are detailed below with reference to the listed Figures.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The current embodiments generally relate to an interactive shopping system. The system may be referred to hereinafter as a smart cart but is not intended to be limiting to any specific embodiment.

Currently, standing in checkout lines at retail stores is time consuming, frustrating, and can negatively affect the customer experience at retail stores.

A benefit of this invention is that the interactive shopping system can save time and provide a more efficient and positive shopping experience.

In embodiments the interactive shopping system comprises a container for holding products selected by at least one user, a user interface, a scanner in communication with a user interface, a processor in communication with the user interface, and a data storage comprising computer instructions executable by the processor.

The container can be a shopping cart, a shopping basket, a shopping bag, or any other item used by persons shopping in a store to hold products intended for purchase.

The user interface can receive or transmit data to the processor and/or data storage. The user interface may communicate through a physical connection, or wirelessly such as by the use of radio waves, infrared communication, line of sight transmission, and the like.

The user interface can be provided by the retail store or can be the at least one user's personal device, such as cellular phone, a smart phone, a tablet computer, a smart watch, a laptop, a computer, a personal digital assistant, or combinations thereof.

In embodiments, the user interface comprises a display or is in electronic communication with a display for displaying information to a user.

A scale can be provided for weighing produce or confirming that the proper product has been placed within the container after scanning.

The scanner can be in communication with the client device to scan products that the user intends to purchase. The scanner can be capable of reading a universal product code, a shape, a quick response code, a bar code, a picture, or combinations thereof. The scanner can identify products that the user has selected for purchase.

Either simultaneously when scanned or at a specified time, products within the container can be verified to be the products that have been scanned for purchase. Components of the system such as the scanner, a camera, the scale, or the like can be utilized for verification. Elements such as size, weight, packaging, and the like can be monitored to determine products within the container.

In embodiments, the scanner can have a first and second mode of operation.

The scanner can have a first mode of operation in which the user scans the item using the scanner before placing the item in the container, or a second mode of operation in which the user places the item in the container before scanning. These first and second modes of operation may be used interchangeably during a shopping transaction.

The user interface may indicate or display a request for the user to scan the item and may send a warning if the user does not scan the item in a prescribed period of time to protect against shoplifting, i.e., not paying for all items in the container. The warning can be a visual or audible indication, a message sent to store personnel, and the like.

The processor can be any electronic circuitry such as a processor or a microprocessor capable of carrying out the instructions of a computer program. The data storage can be any computer readable medium capable of storing data in a non-transitory fashion. The data storage excludes any transitory signals but can include any non-transitory data storage circuitry, such as buffers, cache, and queues, within transceivers of transitory signals.

The processor can be in communication with a data storage configured to bi-directionally communicate with a network, and further in communication with a store administrative processor and a store administrative data storage having a store library comprising product information. In embodiments, a library comprising product information can reside on the data storage and be synchronized at regular time periods, thereby eliminating the need to communicate with the store library.

The data storage or the store administrative data storage can have computer instructions instructing the processor or the store administrative processor to match scanned products with the product information, retrieve the product information as requested by the at least one user, and communicate with the user interface to display the product information or initiate a payment transaction.

In embodiments, the display or the display screen can be touch activated.

Product information can include product specifications, product pricing, and other pertinent information as required by a store or the user. Product specifications can include weight, nutritional information, size of container, packaging description, or any other information used to identify the product.

The system can comprise a visual or audible indicator for determining when a product has been selected for purchase by the user. The indicator can be configured by persons having ordinary skill in the art to signal to a user that an object has been scanned or removed from the container.

The interactive shopping system can include a point of sale system, which can be installed on or in the container. The point of sale system can be in communication with a corresponding mobile application, which can provide payment for the products in the rolling cart or basket, eliminating the need to have to wait in checkout lines.

The interactive shopping system can use a removable sleeve, which can be easily and quickly connected or disconnected to the container. In embodiments, the removable sleeve can be a sheet, such as a plastic cover.

The interactive shopping system can use a store library, which can be located in the store administrative data storage. The store library can contain product prices associated with product weights for products being sold in the store as well as product specifications.

The Figure depicts the interactive shopping system according to one or more embodiments.

In this embodiment, a sleeve 200 can cover the container m one or more embodiments. The interactive shopping system can make use of such a sleeve to convert existing carts to a smart cart in embodiments.

The container can have a scanner 18 and a scale 19 connected to the processor 12 and a power supply 15. The scanner can be any scanner known to persons having ordinary skill in the art, such as a laser, a camera, and the like. The scanner can identify products by matching the appearance to a library of photos, or by scanning and matching an identification code, such as a UPC code, QR code, ISBN code, and the like.

The processor 12 can be in communication with a data storage 14, wherein the processor can be configured to bi-directionally communicate with the network. As discussed before, product information, specifications, weight, pricing, and the like can be stored on a local data storage and synchronized with a master database or retrieved from a central repository in real time.

A user interface 16 is shown connected to the processor 12 and the power supply 15. The user interface can be provided by the store and a part of the smart cart or can be a client device. The user interface can provide useful information to a user, such as a running total of purchases, nutritional information, weights, a map of the store, a location of a desired item, and the like.

Optionally, a client device connector 17 is shown in communication with the processor 12 for syncing the processor 12 with a client device. In embodiments, a wireless communication can also be utilized.

A speaker 20 can provide an audible indication to the user for actions such as scanning items, errors, warnings, and the like to the user or store personnel.

A visual indicator 22, such as a light array is shown mounted to the sleeve 200, wherein the light array can be connected to the processor 12 and the power supply 15.

The visual indicator 22 can be configured by persons having ordinary skill in the art to deliver information to the user or store personnel.

While these embodiments have been described with emphasis on the embodiments, it should be understood that within the scope of the appended claims, the embodiments might be practiced other than as specifically described herein.

What is claimed is:

1. An interactive shopping system comprising:
a container for holding products selected by at least one user; and
a removable sleeve comprising:
   a user interface comprising a display;
   a processor in communication with the user interface, wherein the
     processor is further in communication with a data storage, wherein the data storage comprises computer instructions instructing the processor to:
     match scanned products with product information;
     retrieve product information;
     communicate with the user interface to display the product information; or
     initiate a payment transaction;
   a scanner in communication with the user interface; and
   a scale in communication with the user interface, wherein the scale weighs only items placed within the container, and further wherein the interactive shopping system detects when an item is weighed by the scale without being scanned;
   wherein the container is connected to the removable sleeve and the scale is put into contact with the container, and the container is disconnectable from the removable sleeve and the scale is taken out of contact with the container.

2. The interactive shopping system of claim 1 wherein the container is a basket.

3. The interactive shopping system of claim 1 wherein, when the container is disconnected from the removable sleeve, the communication between the processor and the user interface, the communication between the processor and the data storage, the communication between the scanner and the user interface, and the communication between scale and the user interface are all maintained.

4. The interactive shopping system of claim 1, further comprising a visual or an audible indicator.

5. The interactive shopping system of claim 1 wherein the scanner is a camera.

6. The interactive shopping system of claim 1 wherein the user interface is a cellular phone, a smart phone, a tablet computer, a smart watch, a laptop, a computer, a personal digital assistant, or combinations thereof.

* * * * *